(12) United States Patent
Jäverbring et al.

(10) Patent No.: US 6,269,116 B1
(45) Date of Patent: Jul. 31, 2001

(54) METHOD AND ARRANGEMENT FOR DEMODULATING DATA SYMBOLS

(75) Inventors: Stefan Jäverbring, Gimmerstavägen; Mikael Höök, Bagerbyvägen, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/156,627

(22) Filed: Sep. 18, 1998

(30) Foreign Application Priority Data

Sep. 19, 1997 (SE) ...................................... 9703389

(51) Int. Cl.$^7$ ............................. H03H 7/30; H03K 5/159
(52) U.S. Cl. ........................... 375/229; 375/340; 375/227
(58) Field of Search .................................. 375/229, 230, 375/232, 233, 316, 341, 346, 348, 349, 377, 340, 227; 708/323

(56) References Cited

U.S. PATENT DOCUMENTS

| 5,119,400 | | 6/1992 | Koch . | |
|---|---|---|---|---|
| 5,155,742 | | 10/1992 | Ariyavisitakul et al. . | |
| 5,335,250 | * | 8/1994 | Dent et al. . | |
| 5,400,362 | | 3/1995 | Chennakeshu et al. . | |
| 5,432,821 | * | 7/1995 | Polydoros et al. | ........... 375/340 |
| 5,544,156 | * | 8/1996 | Teder et al. . | |
| 5,909,465 | * | 6/1999 | Bottomley et al. | .......... 375/227 |

FOREIGN PATENT DOCUMENTS

| 0732831A2 | | 9/1996 | (EP) . |
|---|---|---|---|
| 2751815A | * | 1/1998 | (FR) . |

OTHER PUBLICATIONS

Lasne et al, Derwent, Abstract, Jan. 1998.*
IEEE Transactions On Information Theory, vol. 42, No. 2, Mar. 1996, Joachim Hagenauer et al., "Iterative Decoding of Binary Block and Convolutional Codes"; see entire document.

* cited by examiner

*Primary Examiner*—Chi Pham
*Assistant Examiner*—Jean B. Corrielus
(74) *Attorney, Agent, or Firm*—Burns, Doane, Swecker & Mathis, L.L.P.

(57) ABSTRACT

The present invention relates to a method and an arrangement for demodulating data symbols ($d_1$–$d_N$) having been transmitted through a communication channel, particularly a channel suffering from one or more impairments. Received signal samples ($\bar{\rho}$), representing the sent data symbols ($d_1$–$d_N$), are stored (310) and demodulated in both the forward (320) and the backward direction (330), via a demodulator/equaliser. In course of the demodulations are produced a first ($S_F$) and a second ($S_B$) respective set of soft values ($s_k^F$; $s_k^B$), which each is associated with a certain data symbol ($d_k$). (340) From every pair of soft values ($s_k^F$; $s_k^B$) is then determined a joint soft value ($S_k^J$), which e.g. may be utilised for deriving a resulting set of data symbols ($\hat{d}_1$–$\hat{d}_N$) or for directly decoding the payload information contained in the data symbols ($d_1$–$d_N$).

23 Claims, 5 Drawing Sheets

$$S_k^F = \begin{bmatrix} P_F(d_k=A|\rho) \\ P_F(d_k=B|\rho) \\ P_F(d_k=C|\rho) \\ P_F(d_k=D|\rho) \end{bmatrix}$$

$$S_k^B = \begin{bmatrix} P_B(d_k=A|\rho) \\ P_B(d_k=B|\rho) \\ P_B(d_k=C|\rho) \\ P_B(d_k=D|\rho) \end{bmatrix}$$

$$S_k^J = \begin{bmatrix} P_J(d_k=A|\rho) \\ P_J(d_k=B|\rho) \\ P_J(d_k=C|\rho) \\ P_J(d_k=D|\rho) \end{bmatrix}$$

|   | $d_1$ | $d_2$ | $d_3$ |
|---|---|---|---|
| $S_k^F$ | $\begin{bmatrix}0.2\\0.1\\0.3\\0.4\end{bmatrix}$ | $\begin{bmatrix}0.3\\0.2\\0.4\\0.1\end{bmatrix}$ | $\begin{bmatrix}0.4\\0.3\\0.1\\0.2\end{bmatrix}$ |
| $\hat{d}_k^F$ | D | A | A |
| $S_k^B$ | $\begin{bmatrix}0.6\\0.1\\0.1\\0.2\end{bmatrix}$ | $\begin{bmatrix}0.5\\0.2\\0.2\\0.1\end{bmatrix}$ | $\begin{bmatrix}0.1\\0.3\\0.4\\0.2\end{bmatrix}$ |
| $\hat{d}_k^B$ | A | A | C |
| $S_k^J$ | $\begin{bmatrix}0.4\\0.1\\0.2\\0.3\end{bmatrix}$ | $\begin{bmatrix}0.4\\0.2\\0.3\\0.1\end{bmatrix}$ | $\begin{bmatrix}0.25\\0.30\\0.25\\0.20\end{bmatrix}$ |
| $\hat{d}_k^R$ | A | A | B |

FIG. 5

| | $d_1$ | $d_2$ | $d_3$ | $d_4$ | $d_5$ | $d_6$ | $d_7$ | $d_8$ | $d_9$ | $d_{10}$ | ... | $d_{N-3}$ | $d_{N-2}$ | $d_{N-1}$ | $d_N$ |
|---|---|---|---|---|---|---|---|---|---|---|---|---|---|---|---|
| $D_F[\hat{d}_k^F]$ | +1 | +1 | −1 | +1 | +1 | +1 | −1 | −1 | +1 | −1 | ... | −1 | −1 | +1 | +1 |
| $S_F[s_k^F]$ | +0.2 | +0.7 | −0.3 | +0.5 | +2.8 | +0.1 | −0.1 | −0.5 | +0.5 | −1.9 | ... | −0.3 | −0.2 | +0.2 | +0.3 |
| $D_B[\hat{d}_k^B]$ | +1 | +1 | −1 | −1 | +1 | +1 | −1 | +1 | +1 | −1 | ... | −1 | −1 | −1 | +1 |
| $S_B[s_k^B]$ | +0.4 | +0.8 | −.08 | −0.3 | +0.2 | +0.3 | −0.7 | +0.8 | +0.6 | −0.6 | ... | −0.8 | −3.6 | −0.7 | +0.5 |
| $S_J[S_k^J]$ | +0.6 | +1.5 | −1.1 | +0.2 | +3.0 | +0.4 | −0.8 | +0.3 | +1.1 | −2.5 | ... | −1.1 | −3.8 | −0.5 | +0.8 |
| $D_R[\hat{d}_k^R]$ | +1 | +1 | −1 | +1 | +1 | +1 | −1 | +1 | +1 | −1 | ... | −1 | −1 | −1 | +1 |

METHOD AND ARRANGEMENT FOR DEMODULATING DATA SYMBOLS

This application claims priority under 35 U.S.C. §§119 and/or 365 to 9703389-8 filed in Sweden on Sep. 19, 1997; the entire content of which is hereby incorporated by reference.

FIELD OF INVENTION

The present invention relates to a method for demodulating data symbols having been transmitted through a communication channel, particularly a channel suffering from one or more impairments, such as frequency selective fading, inter symbol interference and distortion, which may be temporally constant or time-varying.

The invention also relates to an arrangement for carrying out the method.

DESCRIPTION OF THE PRIOR ART

When digital-data-modulated signals are to be transmitted over a rapidly fading communication channel, such as a radio channel in a mobile radio communications system, a commonly used technique to cope with the changing channel is to include a predetermined data symbol sequence in the transmitted signal at suitably frequent intervals. The known symbol sequence is used in a receiver by a channel equaliser to adapt a demodulator to the channel's characteristics. This procedure is known as training or pre-setting the equaliser.

The equaliser typically used models the channel as a linear FIR filter (FIR=Finite Impulse Response), that is a transversal filter or a tapped delay line having complex multiplication weights applied to the tap outputs.

Figure 1:
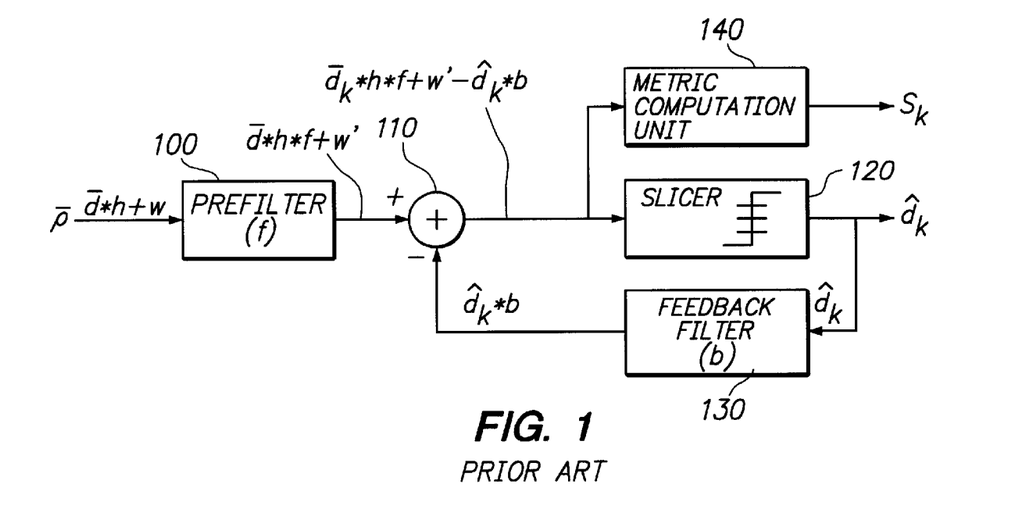
FIG. 1 shows a per se known demodulator/equaliser.

In FIG. 1 is shown an example of such an equaliser, more precisely a decision feedback equaliser (DFE), which regularly adapts two linear filters 100; 130 to the changing communication channel. The first filter 100 is a prefilter, having a first transfer function f, which is defined by a first set of filter coefficients, and the second filter 130 is a feedback filter, with a second transfer function b, which is defined by a second set of filter coefficients. A so called slicer 120 produces hard data decisions $\hat{d}_k$ and a metric computation unit 140 calculates, for each hard data decision $\hat{d}_k$, a corresponding soft value $s_k$. A summation unit 110 subtracts the feedback filter's 130 output signal $\hat{d}_k*b$ from the prefilter's 100 output signal $\bar{d}*h*f+w'$ and delivers a difference signal $\bar{d}*h*f+w'-\hat{d}_k*b$.

The communication channel is assumed to have an impulse response h. Received signal samples, representing sent data symbols $\bar{d}$, are here represented by a sampled vector $\bar{\rho}$. Transmission of the data symbols $\bar{d}$, via the communication channel, corresponds to convoluting the information vector $\bar{d}$ with the channel's impulse response h. Moreover, during the transmission noise w is added. The received signal samples $\bar{\rho}=\bar{d}*h+w$ are sequentially filtered through the prefilter 100, which is regularly adapted, so that the communication channel $\bar{d}*h*f+w'$ becomes minimum phase, i.e. has its impulse response energy concentrated as much as possible to the initial part (w' here represents the noise component w filtered through the prefilter 100,i.e. w'=w*f). The prefilter 100 is also optimised to remove anti-causal ISI (ISI=Inter Symbol Interference), while only moderately amplifying the noise contents w in the signal samples $\bar{d}*h+w$. The feedback filter 130 is regularly adapted to reduce remaining causal ISI between the received data symbols, i.e. to remove the taps after the main tap of h*f.

The prefilter 100 is designed so that this main tap h*f also is real (i.e. includes no imaginary component). For each received burst of signal samples $\bar{d}*h$ the DFE performs: calculation of prefilter 100 and feedback filter 130 coefficients; prefiltering f; feedback filtering b; generation of hard data decisions $\hat{d}_k$ and generation of soft values $s_k$. An estimated burst quality is in most cases also weighed in into the soft values $s_k$.

Figure 2A:
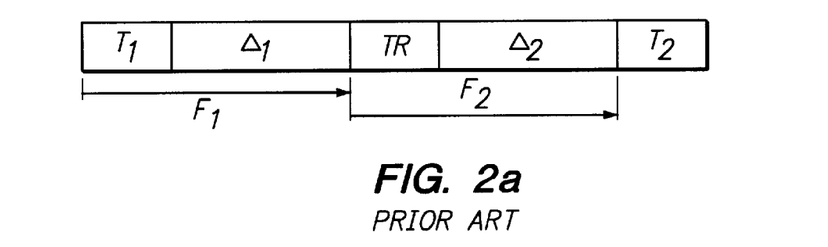
FIG. 2a illustrates a per se known method of forward-demodulating a sequence of received signal samples.
Figure 2B:
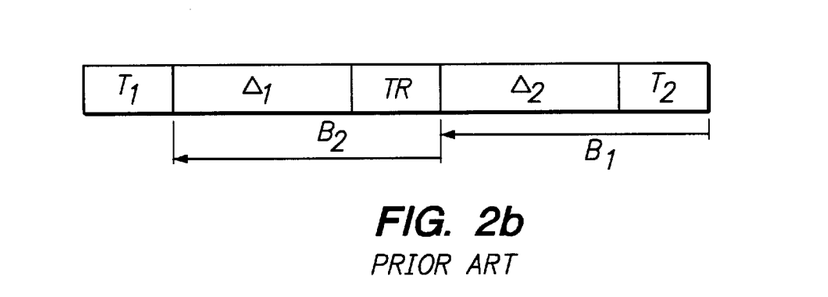
FIG. 2b illustrates a per se known method of backward-demodulating a sequence of received signal samples.

FIGS. 2a and 2b show per se known methods for respective forward- and backward-demodulation of received signal samples in a data burst. The data burst is assumed to comprise a leading tail $T_1$ of known data symbols, a first set of unknown data symbols $\Delta_1$, a known training sequence TR, a second set of unknown data symbols $\Delta_2$ and a trailing tail $T_2$ of known data symbols. Either the data burst is demodulated in the forward direction, whereby primarily $F_1$ the first set of unknown data symbols $\Delta_1$ is demodulated by using the leading tail $T_1$ and secondly $F_2$ the second set of unknown data symbols $\Delta_2$ is demodulated by using the training sequence TR; or the data burst is demodulated in the backward direction, whereby primarily $B_1$ the second set of unknown data symbols $\Delta_2$ is demodulated by using the trailing tail $T_2$ and secondly $B_2$ the first set of unknown data symbols $\Delta_1$ is demodulated by using the training sequence TR.

If forward-demodulation is selected for a particular data burst, the unknown data symbols $\Delta_1$ received initially and the training symbols TR received thereafter are demodulated according to the procedure $F_1$; $F_2$, as described with reference to FIG. 2a above. Nonetheless, before the unknown data symbols $\Delta_2$ received after the data symbols in the known training sequence TR are demodulated, the feedback filter 130 is reset and its contents is replaced with the corresponding symbols, which instead are read from a memory unit at the receiving party. The analogous is, of course, also true when backward-demodulation $B_1$; $B_2$ is selected.

Returning to FIG. 1, after the prefilter 100 each signal sample; is subtracted with a feedback filtered version of a demodulated preceding subset of signal samples, This reduces as much as possible the influence from previously received samples, as well as from later received samples. After that, a hard data decision $\hat{d}_k$ is taken by the slicer 120. The slicer 120 here simply applies a set of symbol decision boundaries to the real part of the current signal value at its input. The demodulated hard data symbol $\hat{d}_k$ is then given by the interval, within which the real part of the current signal value falls.

The soft values $s_k$ are computed in the metric computation unit 140, from prefiltered signal samples $\bar{d}*h*f+w'$, which are subtracted with feedback-filtered demodulated hard data symbols decisions $\hat{d}_k*b$. Every soft value $s_k$ is a vector, whose elements are probability functions, that for each of the possible symbols in the symbol alphabet used, reflect the probability of that symbol being sent. The hard data decision $\hat{d}_k$, made by the slicer 120, naturally implies selection of the most probable symbol sent, which is indicated by the corresponding soft value $s_k$. For binary symbols it is sufficient for the soft value vector $s_k$ to only contain one single element, whose sign indicates a corresponding hard data decision $\hat{d}_k$ and whose modulus reflect the certainty of the hard data decision $\hat{d}_k$.

Generally, data symbols that are located at a small Euclidean distance from the demodulated signal are given a higher probability, than data symbols at larger Euclidean distances. Furthermore, an estimated burst quality is normally weighed into each soft value $s_k$. An estimated high burst quality gives a higher a soft value $s_k$ certainty, than a lower estimated burst quality does.

Further detailed descriptions of equalisers in general, and the DFE in particular, can be found in J. G. Proakis "Digital Communications, 3rd Edition", McGraw-Hill Inc. New York, 1995.

A disclosure of a more efficient demodulator, the so called Decision-Feedback Sequence Estimator (DFSE) is available in A. Duel-Hallen & C. Heegard "Delayed Decision-Feedback Sequence Estimator", IEEE Transactions on Communications, vol. 37, no. 5, May 1989, pp 428–436.

From U.S. Pat. No. 5,400,362 is previously known a method of communicating digital information, in which subslots of received signal samples are passed in both a forward and a backward direction through a demodulator. A subslot quality measure is calculated for each direction. The direction having the highest quality is then chosen for decoding the signal samples of the particular burst.

In the patent document U.S. Pat. No. 5,335,250 is disclosed a method for demodulating data symbols, wherein a set of unknown symbols is sequentially received between two sets of predetermined symbols. A certain reference signal is derived from each of the sets of predetermined symbols. The unknown symbols are forward-demodulated using the first reference signal and backward-demodulated using the second reference signal. Quality values for the forward- and backward-demodulation respectively determine which demodulation order, that is preferable for the unknown symbols.

U.S. Pat. No. 5,155,742 describes a TDM/TDMA digital radio receiver, which determines whether a received burst should be processed in a time-forward or a time-reversed order. A training sequence within the burst is circulated multiple times through an equaliser in the receiver, in both the time-forward and the time-reversed order. The convergence of a minimum mean-square error, calculated during the circulation, settles the optimal processing direction for the burst.

In the paper "Combating Pre- and Post-Cursor Channels Using Forward-Backward State Sequence Detection", International Conference on Telecommunications, Melbourne, April 1997, pp 1–6 N. C. McGinty et al make known a FBSSD (FBSSD=Feed-Backward State Sequence Detector), which minimises the effect of ISI on received digital data. The FBSSD utilises both a forward trellis and a backward trellis. The forward trellis is used to generate estimates of transmitted data, that are used in the backward trellis as estimates of symbols, contained in the pre-cursor component of a particular burst. The post-cursor component of the burst is dealt with by a decision feedback algorithm.

SUMMARY OF THE INVENTION

The present invention offers a highly efficient method of demodulating a received sequence of data symbols, having been transmitted through a communication channel, which suffers from one or more, constant or time-varying impairments, like frequency selective fading, ISI or distortion. The invention is primarily intended to be applied in a radio communications system, however, it may likewise improve the performance of any network based communication, such as a modem connection.

According to all the methods disclosed in the patent documents U.S. Pat. No. 5,400,362, U.S. Pat. No. 5,335,250 and U.S. Pat. No. 5,155,742 received signal samples are, in one way or another, passed in both the forward and the backward direction through a demodulator. However, none of the documents suggests a combination of the information derived from the two demodulation directions. On the contrary, only one particular direction is always selected to be the direction, through which payload information is extracted from a received burst of signal samples.

The above demodulation method taught by N. C. McGinty et al in "Combating Pre- and Post-Cursor Channels Using Forward-Backward State Sequence Detection", International Conference on Telecommunications, Melbourne, April 1997, pp 1–6, implies the use of a forward trellis as well as a backward trellis, for a received burst of signal samples. The result from the forward trellis is here utilised to reduce pre-cursor ISI in the backward trellis. However, the paper neither teaches nor suggests an actual combination of the results from two independent demodulations of the same signal samples, performed in opposite directions.

One object of the present invention is thus, to maximally extract the information contents comprised in a set of sequentially received signal samples and the correlation between them, thereby enabling the best possible reproduction at a receiving party, of the symbol sequence sent out from a transmitting party, regardless of any qualitative variations on the channel used to communicate the symbols.

Another object of the invention is to minimise the influence of error propagation in the demodulation process for a received set of signal samples.

A further object of the invention is to provide an improved arrangement for demodulating a received symbol sequence, by use of a sub-optimal demodulator.

In accordance with the present invention digital-data-modulated symbols that have been transmitted through a communication channel are demodulated according to the following. First, a plurality of signal samples, which represent the data symbols, are sequentially received. Second, the received signal samples are stored. Third, the stored data samples are demodulated in either the forward direction or the backward direction. As a result of this, a first set of soft values is produced, which for each data symbol expresses a first soft value. Fourth, the signal samples are demodulated in a direction, which is opposite to the demodulation direction applied in the third step. This produces a second set of soft values, which for each data symbol expresses a second soft value. Fifth is determined, for each data symbol, a joint soft value from the corresponding first and second soft values respectively.

The joint soft values may then either be sent to a decoding means, for decoding of the payload information in the sent data symbols or directly serve as basis for hard data symbol decisions.

According to a preferred embodiment of the invention the soft values are probability functions that reflect the probability for each of the symbols in the symbol alphabet used.

An arrangement according to the invention comprises the following: means for sequentially receiving a plurality of signal samples; means for storing the received plurality of signal samples; means for forward- and backward-demodulating the stored signal samples, into a first and second set of soft values respectively and; means for deriving a joint soft value for each data symbol, from each pair of first and second soft values.

According to one advantageous embodiment the invention the arrangement moreover comprises means for storing the respective first and second sets of soft values for the demodulated data symbols.

The invention, on average, provides demodulation of a received data signal at a quality level, that is superior to what may be accomplished by a corresponding demodulator, which for every received burst, selects the optimal demodulation direction for the signal samples contained therein.

According to the present invention, the influence of error propagation, due to erroneously received signal samples or erroneously demodulated data symbols, is also minimised.

The demodulated signal quality, which is gained through use of the invention, can be taken advantage of in various ways. For instance, given a particular quality level, the complexity of the demodulator can be lowered. Consequently, without lowering the standards of quality, cheaper, simpler and/or less power consuming demodulation devices may be applied any receiver of digital-data-modulated symbols, such as a radio base station or a mobile terminal.

If instead, the demodulator is fixed, the invention provides a higher data symbol quality than any of the previously known solutions does.

The invention moreover offers very flexible digital demodulation solutions, because it is applicable to any kind of sequentially operating demodulator/equaliser, such as e.g. LE:s (LE=Linear Equaliser), DFE:s, DFSE:s (DFSE=Decision Feedback Sequence Estimation) and RSSE:s (RSSE=Reduced State Sequence Estimation).

The invention will now be described in more detail with reference to preferred exemplifying embodiments thereof and also with reference to the accompanying drawings.

DESCRIPTION OF PREFERRED EMBODIMENTS

Figure 3:
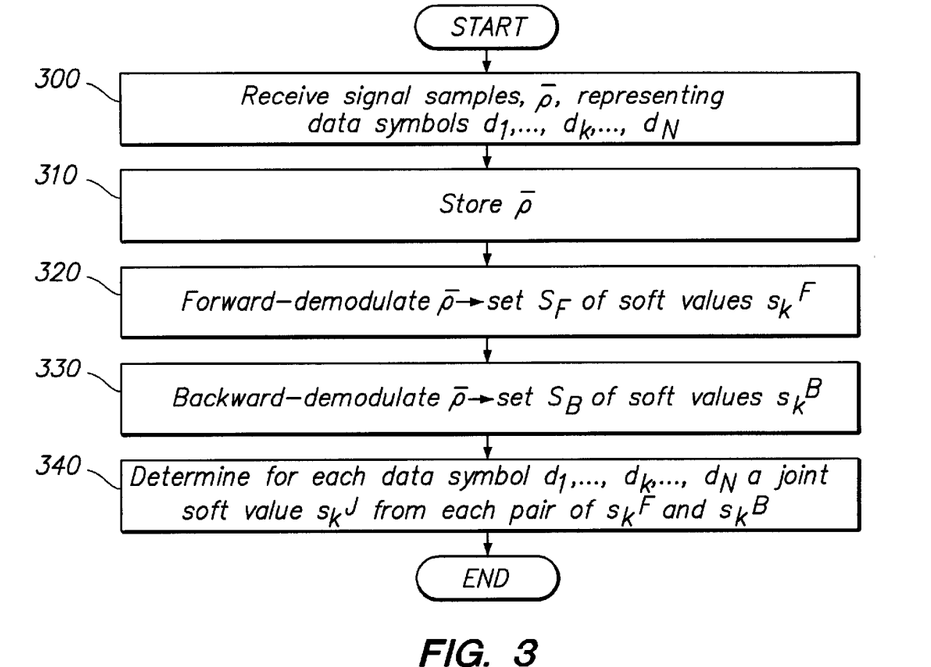
FIG. 3 shows a flow diagram over the inventive method.

In FIG. 3 is depicted a flow diagram over the method according to the invention. Signal samples $\bar{p}$, representing data symbols $d_1, \ldots, d_k, \ldots, d_N$, which have been received over a particular communication channel are collected in a first step 300 and stored in a second step 310. Typically but not necessary, the number of signal samples $\bar{p}$ is a multiple of the number of data symbols N, i.e. the number of elements in the vector $\bar{p}$ equals x·N, where x is a positive integer. The number of signal samples $\bar{p}$ is in any case at least greater than or equal to the number of data symbols N. In a subsequent step 320, the signal samples $\bar{p}$ are demodulated in the forward direction, through a demodulator/equaliser. As a result is obtained, a first set $S_F$ of soft values $s_k^F$, which each is associated with a particular data symbol $d_k$. The soft value $s_k^F$ is a vector, whose elements are probability functions, that for each data symbol in the symbol alphabet used, reflect the probability of that symbol being sent, given the received signal samples $\bar{p}$. If a hard data decision should be requested at this point (e.g. within a DFE), the decision would be the data symbol having the highest probability, according to the soft value $s_k^F$. Somewhat simplified, symbol values that are located at a small Euclidean distance from the demodulated signal are normally given higher probability, than symbol values at larger Euclidean distances. An estimated burst quality measure is also commonly weighed into each soft value $s_k$. An estimated high burst quality gives a soft value $s_k$, which reflects a higher certainty of the corresponding hard symbol decision, than a lower estimated burst quality does.

In a next step 330 the very same signal samples $\bar{p}$ are demodulated in the backward direction, through a demodulator/equaliser, which preferably but not necessary, is identical with the demodulator/equaliser, utilised for the forward-demodulation. The backward-demodulation results in a second set $S_B$ of soft symbol values $s_k^B$, which each similarly is associated with a particular data symbol $d_k$.

The demodulator/equaliser referred to in step 320 and 330 may be of arbitrary kind, of which the DFE discussed with reference to FIG. 1 above constitutes an example. Naturally, it is irrelevant in which order the forward- and backward-demodulation is applied, because both steps 320, 330 always are performed anyway. The order can thus be altered, such that step 330 is carried out before step 320.

In order to make most possible use of the information contents in the received signal samples $\bar{p}$ and the correlation between them, a joint soft value $s_k^J$ is determined from each pair of first and second soft values $s_k^F$; $s_k^B$ in the following step 340.

The joint soft value $s_k^J$, obtained in step 340, may then either be sent to a decoding means, for decoding the payload information in the data symbols or directly serve as basis for hard data decisions $\hat{d}_k$.

Figure 4:
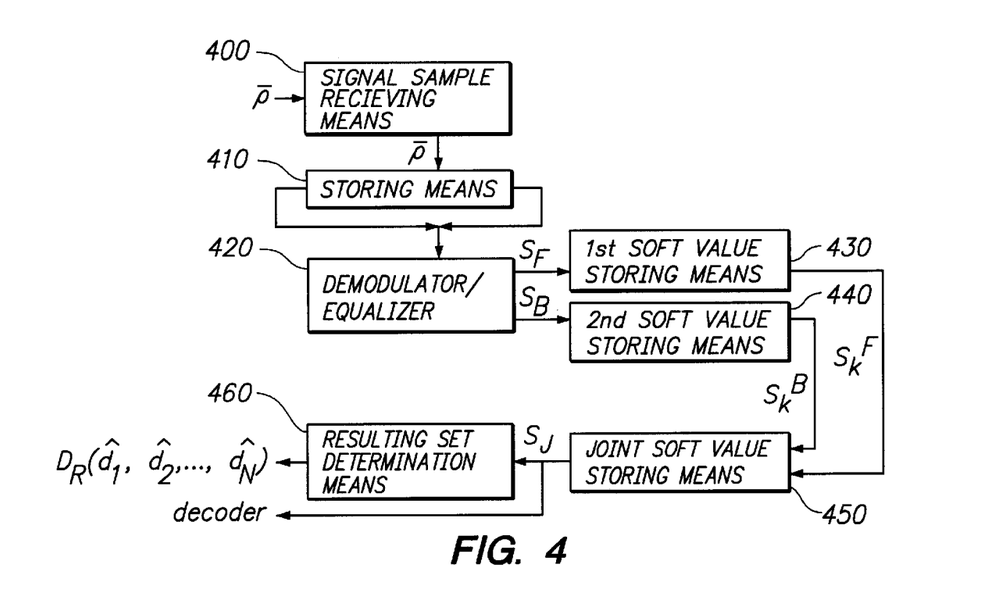
FIG. 4 shows a block diagram over an embodiment of the arrangement according to the invention.

FIG. 4 exemplifies a block diagram over an arrangement for carrying out the inventive method. A means 400 sequentially receives signal samples $\bar{p}$ of a digital-data-modulated signal, which has been transmitted over a communication channel. The received signal samples $\bar{p}$ are stored in a storing means 410, which preferably is a bi-directional shift register. The signal samples $\bar{p}$ are afterwards either shifted out from the first received signal sample to the last received signal sample or from the last to the first received signal sample, whereafter the signal samples $\bar{p}$ are sent to a demodulator/equaliser 420, of arbitrary sub-optimal kind, such as a LE, DFE, DFSE or RSSE. The signal samples $\bar{p}$ will in the former case be demodulated in the forward direction and in the latter case in the backward direction. As a result of the forward-demodulation is obtained, a first set $S_f$ soft values $s_k^F$, $1 \leq k \leq N$. The first set $S_F$ is stored in a storing means 430. The result of the backward-demodulation is similarly a second set $S_B$ of soft values $s_k^F$, $1 \leq k \leq N$, which is stored in a storing means 440. When the two such sets $S_F$; $S_B$ have been produced, the soft values $s_k^F$; $s_k^B$ are sent to a means 450, where for each data symbol $d_1-d_N$ a joint soft symbol value $s_k^J$ is derived from each pair of first $s_k^F$ and second $s_k^J$ soft value respectively.

The joint soft symbol value $s_k^J$ are collected in a third set $S_J$ of soft values.

The joint soft values $s_k^J$ in the third set $S_J$ may then either be forwarded to a means 460, which determines a resulting set $D_R(\hat{d}_1, \hat{d}_2, \ldots, \hat{d}_N)$ of data symbols $\hat{d}_1-\hat{d}_N$ or to a decoder, which derives payload information, coded into the sent data symbols $d_1-d_N$, directly from the joint soft values $s_k^J$.

The arrangement is advantageously comprised in e.g. a radio base station, a radio base station controller or a mobile radio station, where fast and efficient equalisation of digital-data-modulated signals is demanded. However, the arrangement is applicable also in purely network based connections, such as modem connections.

Figure 5:
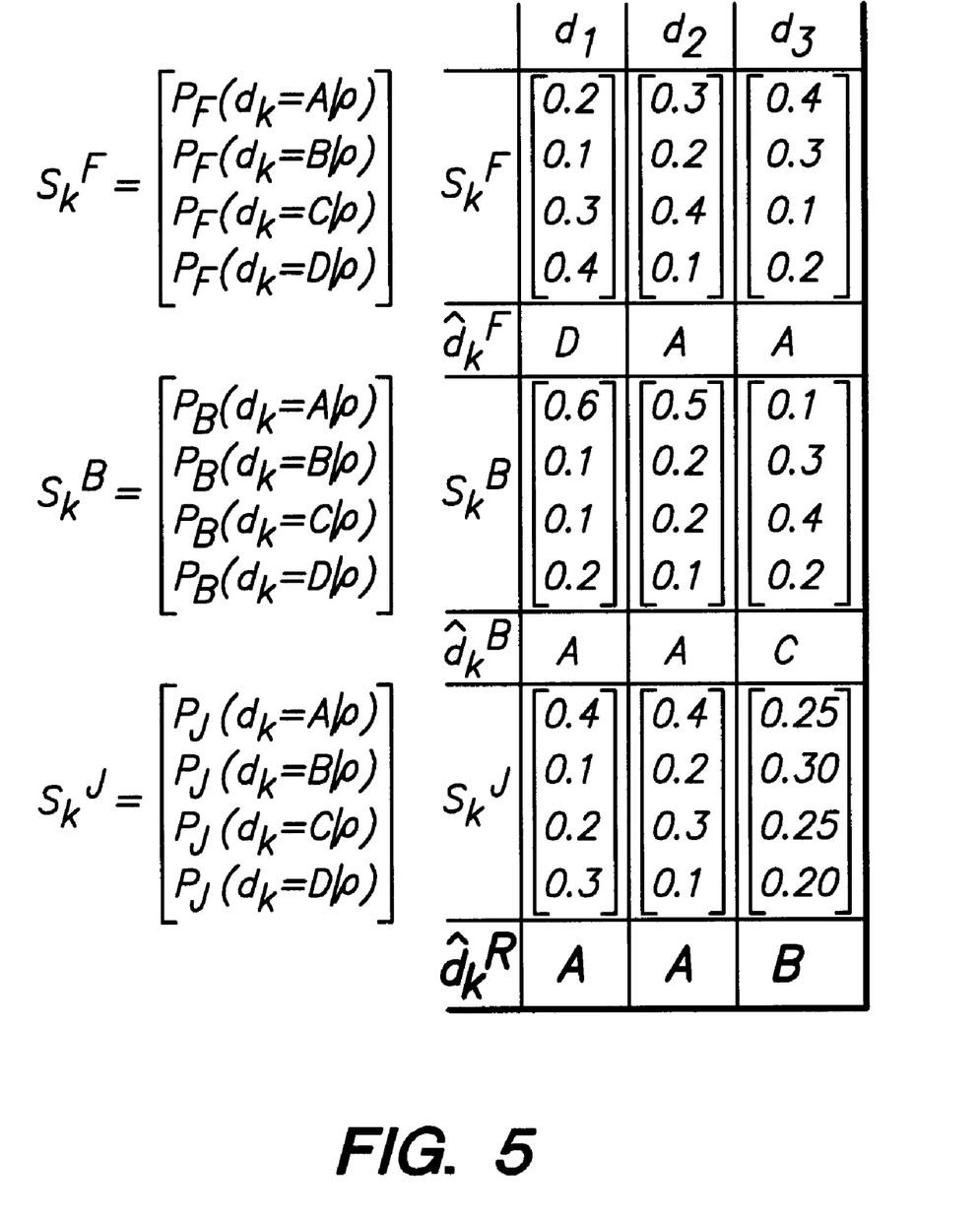
FIG. 5 shows a table, comprising intermediate and final demodulation results of the inventive method, when applying it the to an example sequence of signal samples representing multi-bit symbols.

A first example illustrating the inventive concept is shown in a table of FIG. 5. Three multi-bit data symbols $d_1$, $d_2$ and $d_3$, from a particular alphabet [A, B, C, D], are assumed to have been sent from a transmitting party to a receiving party over a communication channel, which suffers from one or more impairments. Due to the instability of the communication channel it is not readily obvious from signal samples at the receiving party, which symbols $d_1(A, B, C, D)$, $d_2(A, B, C, D)$ and $d_3(A, B, C, D)$, that have been sent.

Received signal samples $\bar{\rho}$ are forward-demodulated into a first set of soft values $S_F$, which each is a vector $s_k^F$ comprising probabilities $P_F(d_k=A|\bar{\rho})$, $P_F(d_k=B|\bar{\rho})$, $P_F(d_k=C|\bar{\rho})$; $P_F(d_k=D|\bar{\rho})$ for the data symbols $d_1$, $d_2$ and $d_3$ being the respective symbols A, B, C; D of the alphabet, given the received signal samples $\bar{\rho}$. In this example, the symbol value D is estimated to be the most probable first data symbol $d_1$ sent, since the first soft value S1 indicates that this symbol has the highest probability 0.4. If a hard data symbol decision $\hat{d}_1$ were to be made on basis of the first soft value $s_1^F$, the data symbol D would therefore be decided. According to the invention however, the signal samples $\bar{\rho}$ are also backward-demodulated into a second set $S_B$ soft value, which each similarly is a vector $s_k^B$, that comprises probabilities $P_B(d_k=A|\bar{\rho})$, $P_B(d_k=B|\bar{\rho})$, $P_B(d_k=C|\bar{\rho})$; $P_B(d_k=D|\bar{\rho})$ for the data symbols $d_1$, $d_2$ and $d_3$ being the respective symbols A, B, C; D of the alphabet, given the received signal samples $\bar{\rho}$. The most probable first data symbol d, sent, is now judged to be A, since the second soft value $s_1^b$ indicates that this data symbol has the highest probability 0.6.

A joint soft value $s_1^J$ is derived from the first $s_1^F$ and the second $s_1^B$ soft values by simply calculating an element-by-element average vector between the first $s_1^F$ and the second $s_1^B$ soft values. After performing this, a resulting hard data decision, $\hat{d}_1^F$ may be taken for the first data symbol $d_1$. The symbol value A is selected, because the joint soft value $s_1^J$ indicates that this data symbol has the highest combined probability 0.4.

In a corresponding manner, the resulting hard data decisions $\hat{d}_2^R=A$ and $\hat{d}_3^R=B$ are taken for the second and the third data symbols $\hat{d}_2^R$ and $\hat{d}_3^R$ respectively. The first data symbol $d_1$ thus constitutes an example of a "survival-of-the-fittest" hard data decision (i.e. the most probable of two diverging data symbol estimates is selected), while the second data symbol $d_2$ is an example of a "unanimous" hard data decision (i.e. a combination of two agreeing data symbol estimates) and the third data symbol $d_3$ is an example of a "compromise" hard data decision (i.e. when a combination of the first $s_k^F=A$ and the second $s_k^B=C$ soft values results in a third data symbol B, B≠A; B≠C is estimated to be the most probable data symbol sent).

All the soft values $s_k^F$, $s_k^B$ and $s_k^J$ may for binary data symbols, as well as for individual bits of multi-bit symbols, be expressed via so called log-likelihood functions. The function $s_k^X=\ln(P(d_k=+1|\bar{\rho})/P(d_k=-1|\bar{\rho}))$, where X=F, B or J is an example of such a log-likelihood function, for binary data symbols $d_k(+1,-1)$. The log-likelihood function is so a transformation of the data symbol probability into a logarithmic representation. When log-likelihood functions are used for obtaining the first $s_k^F$ and the second $s_k^B$ soft values, a joint soft value $s_k^J$ is derived by adding the first $s_k^F$ and the second $s_k^B$ soft values together (which is the logarithm correspondence to calculating an average value).

Figure 6:
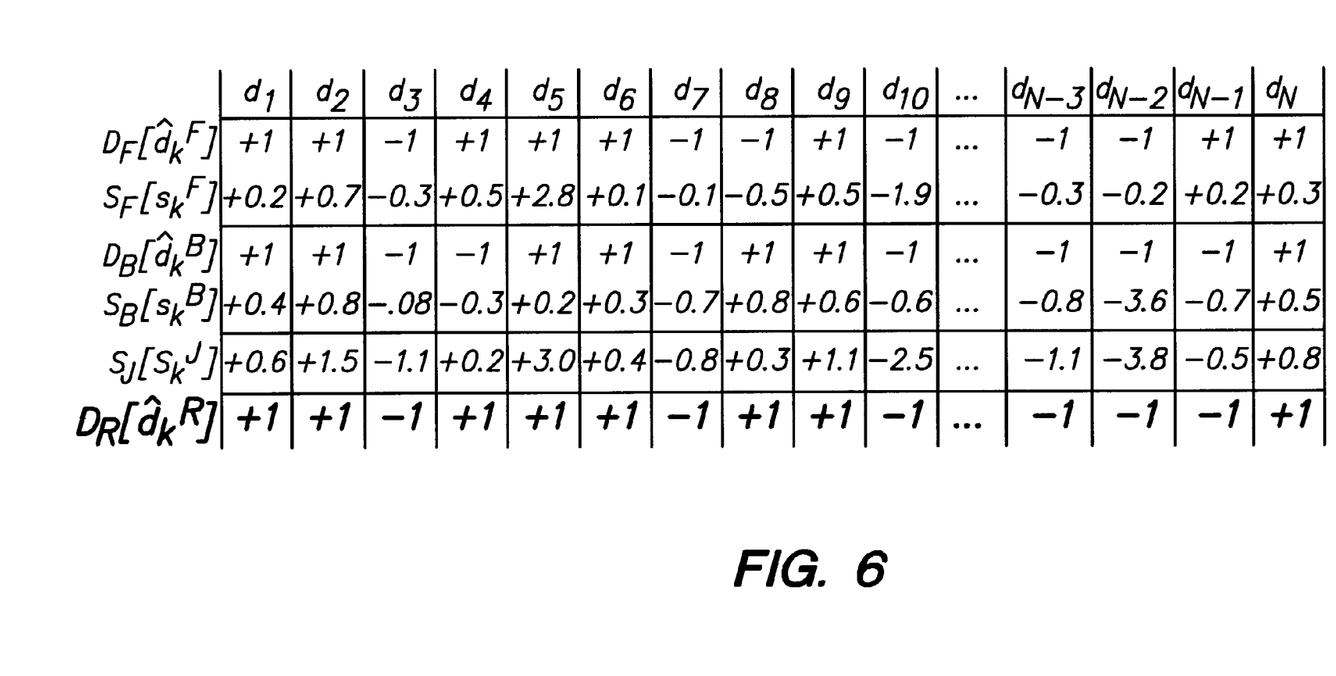
FIG. 6 shows a table, comprising intermediate and final demodulation results of the inventive method, when applying it the to an example sequence of signal samples representing binary symbols.

An example illustrating this aspect of the inventive concept is shown in the table of FIG. 6. On one hand, signal samples representing a sequence of binary data symbols $d_1-d_N$, from an alphabet [−1,+1], are assumed to have been demodulated in the forward direction. This demodulation has resulted in a first set $S_F[s_k^F]$ of soft values $s_k^F$, $1 \leq k \leq N$. For reasons of clarity the corresponding hard data decisions $D_F[\hat{d}_k^F]$ are here indicated alongside the soft values $s_k^F$. Nevertheless, the hard data decisions $D_F[\hat{d}_k^F]$ are, in most cases, unnecessary to take at this point in the process. If a hard data decisions $D_F[\hat{d}_k^F]$ yet were to be taken, a soft value $s_k^F$ smaller than 0 would be interpreted as the first hard data symbol −1 in the alphabet, while a soft symbol value $s_k^F$ greater than 0 would be interpreted as the second hard data symbol +1 in the alphabet.

On the other hand, the signal samples are also assumed to have been demodulated in the backward direction. The result of this is a second set $S_B[s_k^B]$ of soft values $s_k^B$, $1 \leq k \leq N$. The corresponding hard data decisions $D_B[\hat{d}_k^B]$ are for the sake of consistency indicated here as well.

A joint soft value $s_k^J$ is then derived from the soft values $s_k^F$; $s_k^B$, for each data symbol $d_1-d_N$, by adding together the soft values $s_k^F$ and $s_k^B$, that relate to the same data symbol $d_k$.

A soft value above zero thus corresponds to a first hard data decision $\hat{d}_k^R=+1$ and a soft value below zero corresponds to a second hard data decision $\hat{d}_k^R=-1$. A large modulus of a soft value means that the corresponding demodulated hard data decision has a relatively high probability of being a correct estimation of the sent data symbol. A soft value with a small modulus, on the other hand, indicates a fairly uncertain hard data decision. To sum up, the sign of the soft value indicates the binary symbol value and modulus of the soft value reflects certainty of the corresponding hard data decision.

As can be seen in the table of FIG. 6, the forward- and backward-demodulated soft values $s_k^F$; $s_k^B$ for some of the data symbols $\hat{d}_4$, $\hat{d}_8$ and $\hat{d}_{N-1}$ have different signs. When the signs of the soft values $s_k^F$; $s_k^B$ so differ, the soft value having the largest modulus (i.e. highest hard data decision certainty) determines the hard data symbol decision $\hat{d}_k^R$, in a resulting set $D_R[\hat{d}_k^R]$. Hence, the resulting set of hard data decisions $D_R[\hat{d}_k^R]$ need not be identical with any of the first $D_F[\hat{d}_k^R]$ and the second $D_B[\hat{d}_k^B]$ sets of hard data decisions. Nevertheless, the resulting set $D_R[\hat{d}_k^R]$, on average, constitutes a more correct representation of the transmitted digital information.

If instead multi-bit symbols, like the two-bit symbols A=00, B=01, C=10; D=11, exemplified in FIG. 5, are communicated, a soft value for each specific bit of a symbol can be expressed via the following log-likelihood functions. The soft value $s_k^F$ for the first bit $B_{\#1}$, when demodulated in the forward direction is $$LLR_F(B_{\#1}) = \ln\left(\frac{P_F(d_k = C|\overline{p}) + P_F(d_k = D|\overline{p})}{P_F(d_k = A|\overline{p}) + P_F(d_k = B|\overline{p})}\right)$$

and the corresponding expression for the second bit $B_{\#2}$ is $$LLR_F(B_{\#2}) = \ln\left(\frac{P_F(d_k = B|\overline{p}) + P_F(d_k = D|\overline{p})}{P_F(d_k = A|\overline{p}) + P_F(d_k = C|\overline{p})}\right).$$

The soft value $s_k^B$ for the same bits $B_{\#1}$; $B_{\#2}$ in the backward direction are $$LLR_B(B_{\#1}) = \ln\left(\frac{P_B(d_k = C|\overline{p}) + P_B(d_k = D|\overline{p})}{P_B(d_k = A|\overline{p}) + P_B(d_k = B|\overline{p})}\right) \text{ and}$$

$$LLR_B(B_{\#2}) = \ln\left(\frac{P_B(d_k = B|\overline{p}) + P_B(d_k = D|\overline{p})}{P_B(d_k = A|\overline{p}) + P_B(d_k = B|\overline{p})}\right)$$

respectively. Consequently all the soft values $s_k^F$, $s_k^B$ and $s_k^B$ can be expressed via the log-likelihood functions $$LLR_X(B_{\#1}) = \ln\left(\frac{P_X(d_k = C|\overline{p}) + P_X(d_k = D|\overline{p})}{P_B(d_k = A|\overline{p}) + P_B(d_k = B|\overline{p})}\right) \text{ and}$$

$$LLR_X(B_{\#2}) = \ln\left(\frac{P_X(d_k = B|\overline{p}) + P_X(d_k = D|\overline{p})}{P_X(d_k = A|\overline{p}) + P_X(d_k = B|\overline{p})}\right),$$

where X=F, B or J.

Figure 7:
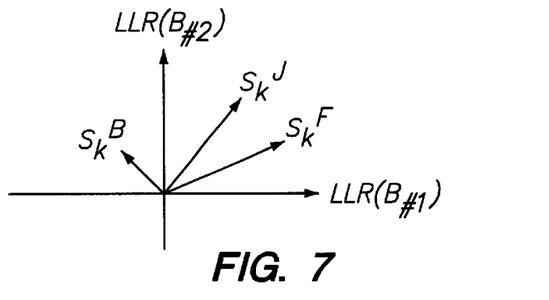
FIG. 7 graphically illustrates how soft values for the individual data bits of a two-bit data symbol are combined into a joint soft value for the symbol, in accordance with the inventive principle.

In FIG. 7 is depicted a graphical illustration of vectors representing a first $s_k^F$, a second $s_k^B$ soft value and a joint soft value $s_k^J$, where the joint soft value $s_k^J$ is the vector sum of the first and the second soft values $s_k^F$; $s_k^B$.

Further details as to how log-likelihood functions may be employed to reflect soft values for individual data bits can be found in J. Hagenauer et al, "Iterative Decoding of Binary Block and Convolutional Codes", IEEE Transactions on Information Theory, vol. 42, no. 2, March 1996, pp 429–445. The document also teaches generally how soft bit values may be used as a complement to hard bit decisions, when demodulating received digital signals.

Figure 8:
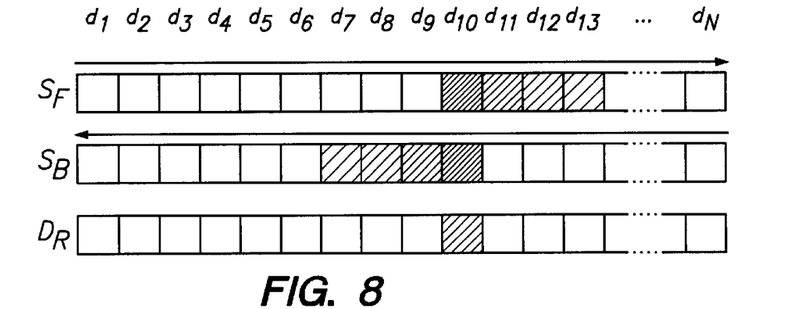
FIG. 8 graphically illustrates how error propagation is suppressed through the inventive method.

A graphical illustration of how error propagation is suppressed by the inventive method is found in FIG. 8. In all previously known sub-optimum demodulation methods, there is a risk that the effects of any erroneously received signal samples or erroneously demodulated data symbols may propagate to one or more adjacent data symbols. If however, there is an error in a data symbol in the present invention, such error propagation will, if it occurs, be distributed in opposite directions from the erroneous data symbol, during the forward- and backward-demodulation respectively. The exemplified error in a 10th data symbol $d_{10}$, is here assumed to propagate to the three later received data symbols $d_{11}$, $d_{12}$ and $d_{13}$, when demodulating in the forward direction and to the three earlier received data symbols $d_7$, $d_8$ and $d_9$, when demodulating in the backward direction. The combination DR of the soft values $S_F$; $S_B$ from the two demodulation directions, causes the error propagation effects to cancel each other out. Hence, the influence of error propagation during demodulation of a received set of signal samples is reduced significantly through the present invention.

Figure 9:
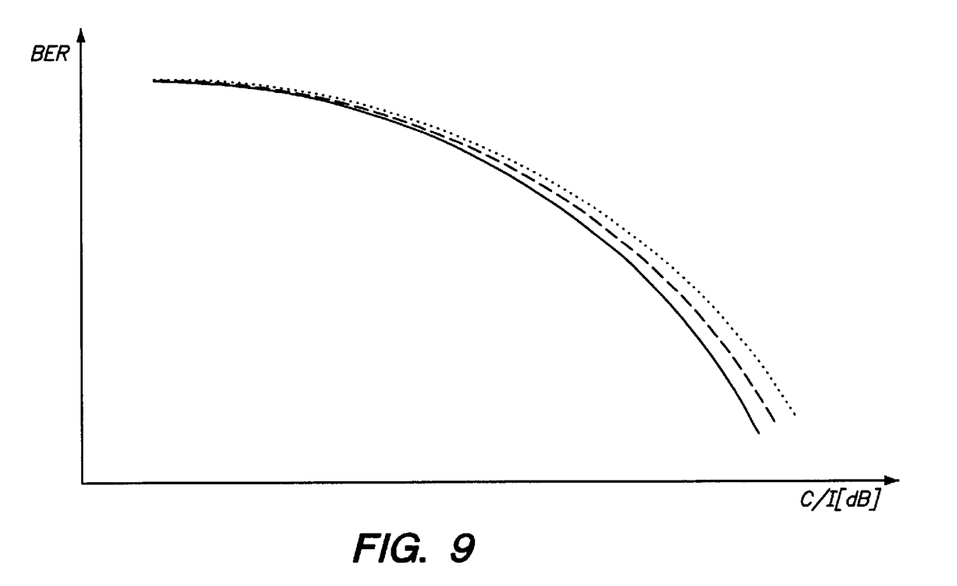
FIG. 9 shows a diagram over the qualitative performance of the inventive method, in relation to some previously known demodulation methods.

The qualitative performance of the inventive method, in relation to the previously known demodulation methods, is illustrated in a diagram of FIG. 9. Along the vertical axis is represented the Bit Error Rate BER of a demodulated sequence of digital symbols, while the carrier-to-interferer level C/I is indicated in decibel dB along the horizontal axis. A dotted line shows the performance of a typical uni-directional demodulator/equaliser (always operating in the forward direction) in respect to these two parameters, a dashed line shows the corresponding performance of a demodulator/equaliser, which demodulates every received burst of signal samples in the optimal direction for that particular burst and an unbroken line shows the corresponding performance of a demodulator/equaliser operating according to the invention. The same DFE is assumed to be utilised in all three cases.

For very low C/I-levels, the differences in performance between the three demodulating principles are measurable, but not considerable. For higher C/I-levels however, the differences between the principles are more significant. In any case, the invention always performs better (i.e. gives a lower BER) than both the uni-directional demodulator/equaliser and the demodulator/equaliser, that consequently selects the optimal demodulation direction for the received signal samples.

What is claimed is:

1. A method of demodulating data symbols transmitted through a communication channel, comprising the steps of:
    sequentially receiving a plurality of signal samples representing the data symbols;
    storing the received plurality of signal samples;
    forward-demodulating the stored signal samples into a first set of soft values, each associated with a particular data symbol;
    backward-demodulating the stored signal samples into a second set of soft values, each associated with a particular data symbol;
    determining, from the first and the second sets of soft values, a joint set of soft values, which for each data symbol expresses a joint soft value.

2. A method according to claim 1, wherein the data symbols are multi-bit symbols.

3. A method according to claim 2, wherein the soft values are vectors, in which each element reflects the probability for a particular demodulated data symbol.

4. A method according to claim 2, wherein a soft value having a sign and a modulus is determined for each individual data bit of the data symbols; and
    wherein each soft value reflects the probability for a particular demodulated data bit.

5. A method according to claim 1, wherein the data symbols are binary.

6. A method according to claim 4, wherein the sign of the soft value indicates a decided data bit of a corresponding hard data decision; and
    wherein the modulus of the soft value.

7. A method according to claim 6, wherein each joint soft value is constituted by the sum of the first and the second soft values for a particular data bit.

8. A method according to claim 6, wherein the soft values are expressed as log-likelihood functions.

9. A method according to claim 4, wherein all soft values are probability functions.

10. A method according to claim 4, wherein all soft values are probabilities.

11. A method according to claim 3, wherein all soft values are probabilities.

12. A method according to claim 10, wherein each joint soft value is determined as an element-by-element average value between a first soft value from the first set of soft values and a corresponding first soft value from the second set of soft values.

13. A method according to claim 3, wherein all soft values are probability functions.

14. A method according to claim 1, wherein the signal samples are demodulated via linear equalisation.

15. A method according to claim 1, wherein the signal samples are demodulated via decision feedback equalisation.

16. A method according to claim 1, wherein the signal samples are demodulated via decision feedback sequence estimation.

17. A method according to claim 1, wherein the signal samples are demodulated via reduced state sequence estimation.

18. An arrangement for demodulating data symbols transmitted through a communication channel, comprising:

means for sequentially receiving a plurality of signal samples;

means for storing the received plurality of signal samples;

means for forward-demodulating the stored signal samples into a first set of soft values;

means for backward-demodulating the stored signal samples into a second set of soft values;

means for deriving a joint soft value from a first soft value of the first set from soft values and a corresponding first soft value of the second set from soft values, for each data symbol.

19. An arrangement according claim 18, further comprising:

means for storing the first set of soft values; and means for storing the second set of soft values.

20. An arrangement according claim 18, further comprising:

means for deriving a resulting set of data symbols from the joint soft values.

21. An arrangement according to claim 18, wherein said arrangement is a component in a radio base station.

22. An arrangement according to claim 18, wherein said arrangement is a component in a radio base station controller.

23. An arrangement according to claim 18, wherein said arrangement is a component in a mobile radio station.

* * * * *